(12) United States Patent
Yamanaka

(10) Patent No.: US 9,662,755 B2
(45) Date of Patent: May 30, 2017

(54) VEHICLE STEERING SYSTEM AND MANUFACTURING METHOD FOR VEHICLE STEERING SYSTEM

(71) Applicant: JTEKT CORPORATION, Osaka-shi, Osaka (JP)

(72) Inventor: Kosuke Yamanaka, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 294 days.

(21) Appl. No.: 14/679,782

(22) Filed: Apr. 6, 2015

(65) Prior Publication Data

US 2015/0209921 A1     Jul. 30, 2015

Related U.S. Application Data

(62) Division of application No. 13/979,199, filed as application No. PCT/JP2012/052378 on Feb. 2, 2012.

(30) Foreign Application Priority Data

Feb. 16, 2011   (JP) ................................ 2011-030893

(51) Int. Cl.
*B23P 19/04*     (2006.01)
*B62D 5/04*      (2006.01)
*B62D 5/00*      (2006.01)

(52) U.S. Cl.
CPC .............. *B23P 19/04* (2013.01); *B62D 5/001* (2013.01); *B62D 5/0427* (2013.01); *B62D 5/0448* (2013.01); *Y10T 29/49945* (2015.01)

(58) Field of Classification Search
CPC .... B62D 5/001; B62D 5/0427; B62D 5/0448; Y10T 29/49945
See application file for complete search history.

(56) References Cited

U.S. PATENT DOCUMENTS 1,231,885 A * 7/1917 Heinze ................. B62D 5/0463
                                                            180/443
2,446,393 A    8/1948 Russel
(Continued)

FOREIGN PATENT DOCUMENTS

DE    198 05 383 A1   8/1998
EP    0 882 637 A1    12/1998
(Continued)

OTHER PUBLICATIONS

Nov. 17, 2015 Office Action issued in U.S. Appl. No. 13/979,199.
(Continued)

*Primary Examiner* — Jason L Vaughan
*Assistant Examiner* — Amanda Meneghini
(74) *Attorney, Agent, or Firm* — Oliff PLC

(57) ABSTRACT

Provided is a vehicle steering system that is able to restrict a travel amount of a steered shaft in a housing, that is small and that has an excellent strength. The vehicle steering system is a steer-by-wire vehicle steering system that converts rotative power of electric motors into a movement of a steered shaft in an axial direction via a ball screw mechanism. One of contact portions at respective ends of a screw shaft at an intermediate part of the steered shaft passes through a rotor based on a moving direction of the steered shaft so as to contact a corresponding one of the corresponding stoppers thereby restricting a travel amount of the steered shaft. The stoppers are made of a material different from that of the housing and having a high strength.

7 Claims, 11 Drawing Sheets

(56) References Cited

U.S. PATENT DOCUMENTS

| | | | |
|---|---|---|---|
| 4,295,384 A | 10/1981 | Brandt et al. | |
| 6,079,513 A | 6/2000 | Nishizaki et al. | |
| 6,394,218 B1 | 5/2002 | Heitzer | |
| 7,401,677 B2* | 7/2008 | Boyle | B62D 7/148 |
| | | | 180/400 |
| 8,827,031 B2* | 9/2014 | Tashiro | B62D 5/0427 |
| | | | 180/444 |
| 8,925,938 B2 | 1/2015 | Yamanaka | |
| 2007/0169984 A1* | 7/2007 | Ogawa | B62D 6/008 |
| | | | 180/402 |
| 2010/0236860 A1 | 9/2010 | Hoersh et al. | |
| 2012/0024616 A1 | 2/2012 | Birkwald et al. | |
| 2014/0034410 A1 | 2/2014 | Jackson et al. | |

FOREIGN PATENT DOCUMENTS

| | | | |
|---|---|---|---|
| JP | 54-181424 U | 12/1979 | |
| JP | 6-37060 U | 5/1994 | |
| JP | 6-144283 A | 5/1994 | |
| JP | 11-222146 A | 8/1999 | |
| JP | 2000-62630 A | 2/2000 | |
| JP | 2001-80530 A | 3/2001 | |
| JP | 2006-123723 A | 5/2006 | |
| JP | 2009-29225 A | 2/2009 | |
| JP | 4221656 B2 | 2/2009 | |
| JP | 2009-90788 A | 4/2009 | |

OTHER PUBLICATIONS

Mar. 24, 2016 Office Action issued in U.S. Appl. No. 13/979,199.
Jul. 13, 2016 Search Report issued in European Patent Application No. 12747581.2.
International Search Report issued in International Patent Application No. PCT/JP2012/052378 dated May 1, 2012.
Jul. 10, 2015 Office Action issued in U.S. Appl. No. 13/979,199.

* cited by examiner

VEHICLE STEERING SYSTEM AND MANUFACTURING METHOD FOR VEHICLE STEERING SYSTEM

This is a Division of application Ser. No. 13/979,199 filed Jul. 11, 2013, which in turn is a National Phase of Application of PCT/JP/2012/052378 filed Feb. 2, 2012. The disclosure of the prior applications is hereby incorporated by reference herein in its entirety.

TECHNICAL FIELD

The present invention relates to a vehicle steering system and a manufacturing method for a vehicle steering system.

BACKGROUND ART

In a vehicle steering system, a travel amount of a steered shaft is usually restricted by bringing a joint, which connects the steered shaft and a tie rod to each other, into contact with a rack stopper attached to an end portion of a housing, from outside the housing. Patent Document 1 discloses such a vehicle steering system.

Further, Patent Document 2 discloses a hydraulic power steering system in which a rack stopper is made of a synthetic resin member, in which a metal cored bar is inserted, to suppress noise of collision between the aforementioned joint and the rack stopper.

Further, Patent Document 3 discloses a steering rack rattling noise prevention device that prevents occurrence of rattling noise by bringing a rack end plate into contact with an elastic member attached to an end portion of a housing from outside the housing.

Further, Patent Document 4 and Patent Document 5 each disclose an electric power steering system in which an axial travel amount of a steered shaft is restricted by bringing part of the steered shaft into contact with a stopper portion formed in a housing itself from inside the housing.

Further, Patent Document 6 discloses a by-wire vehicle steering system including a pair of electric motors opposed to each other in an axial direction of a steered shaft and surrounding the steered shaft concentrically.

Further, Patent Document 7 discloses a steering system in which a ball nut is arranged radially inward of a rotor of an electric motor.

PRIOR ART DOCUMENTS

Patent Documents

Patent Document 1: Japanese Patent Application Publication No. 11-222146
Patent Document 2: Japanese Utility Model Application Publication No. 6-037060
Patent Document 3: Japanese Utility Model Application Publication No. 54-181424
Patent Document 4: Japanese Patent Application Publication No. 2000-62630
Patent Document 5: Japanese Patent Application Publication No. 6-144283
Patent Document 6: U.S. Pat. No. 4,221,656
Patent Document 7: Japanese Patent Application Publication No. 2001-80530

SUMMARY OF THE INVENTION

Problem to be Solved by the Invention

In a case where a rear wheel is used as a steered wheel in a loading vehicle such as a forklift, for example, the maximum steered angle is approximately 80°, which is very large. For this reason, in Patent Documents 1, 2, 3, it is very difficult to lay out, outside a housing, a restriction mechanism that restricts a travel amount of a steered shaft.

Further, in a case where a restriction mechanism is laid out inside a housing, like Patent Documents 4, 5, an increase in size of the housing should be avoided.

Further, if a stopper is provided in a housing itself, it is necessary to ensure a sufficient strength as a housing so that the housing is be able to endure even if a steered wheel which is steered at the maximum steering angle, for example, collides with a curb stone or the like.

On the other hand, if a stopper provided as a member different from a tubular housing is mounted in a deeper side of the housing, it is expected that working performance of assembly would worsen.

One object of the present invention is to provide a vehicle steering system that is able to restrict a travel amount of a steered shaft in a housing, that is small, and that has an excellent strength.

Means for Solving the Problem

One feature of the present invention is as follows: in a steer-by-wire vehicle steering system (1) that converts rotative power of electric motors (21, 22) into a movement of a steered shaft (6) in an axial direction (X1) via a ball screw mechanism (23), the vehicle steering system including: a threaded shaft (32) provided at an intermediate part of the steered shaft; a ball nut (33) screwed to the threaded shaft via balls (34) and rotatable together with a rotor (26) of the electric motors; a tubular housing (5) that houses the electric motors and the ball nut and through which the steered shaft is passed; and first and second stoppers (47, 48, 470, 480, 147, 148) arranged at first and second end portions (51, 52) of the housing, respectively, the steered shaft has first and second contact portions (45, 46) located respectively at first and second end portions of the threaded shaft, radial gaps (S1, S2) are formed between outer peripheries of the contact portions and an inner periphery of the rotor so that each of the contact portions is allowed to be inserted into the rotor, and when the steered shaft moves in the axial direction, one of the contact portions, which is on a moving direction side and passed through the rotor, contacts a corresponding one of the stoppers, so that a travel amount of the steered shaft in the axial direction is restricted.

Effects of the Invention

According to the present invention, based on a moving direction of a steered shaft, corresponding contact portion of the steered shaft passes through a rotor so as to contact a corresponding one of stoppers, thereby restricting a travel amount of the steered shaft. Because the stoppers are formed of members different from the housing, it is possible to form the stoppers from a material having a strength higher than that of the housing, thereby making it possible to improve a strength of a vehicle steering system. Further, first and second contact portions housed in the rotor are formed respectively at first and second end portions of a threaded shaft provided at an intermediate part of the steered shaft. Accordingly, it is possible to restrict the travel amount of the steered shaft within the housing, while reducing the size in an axial direction and a radial direction. Further, the stoppers do not run on the threaded shaft.

MODES FOR CARRYING OUT THE INVENTION

Figure 1:
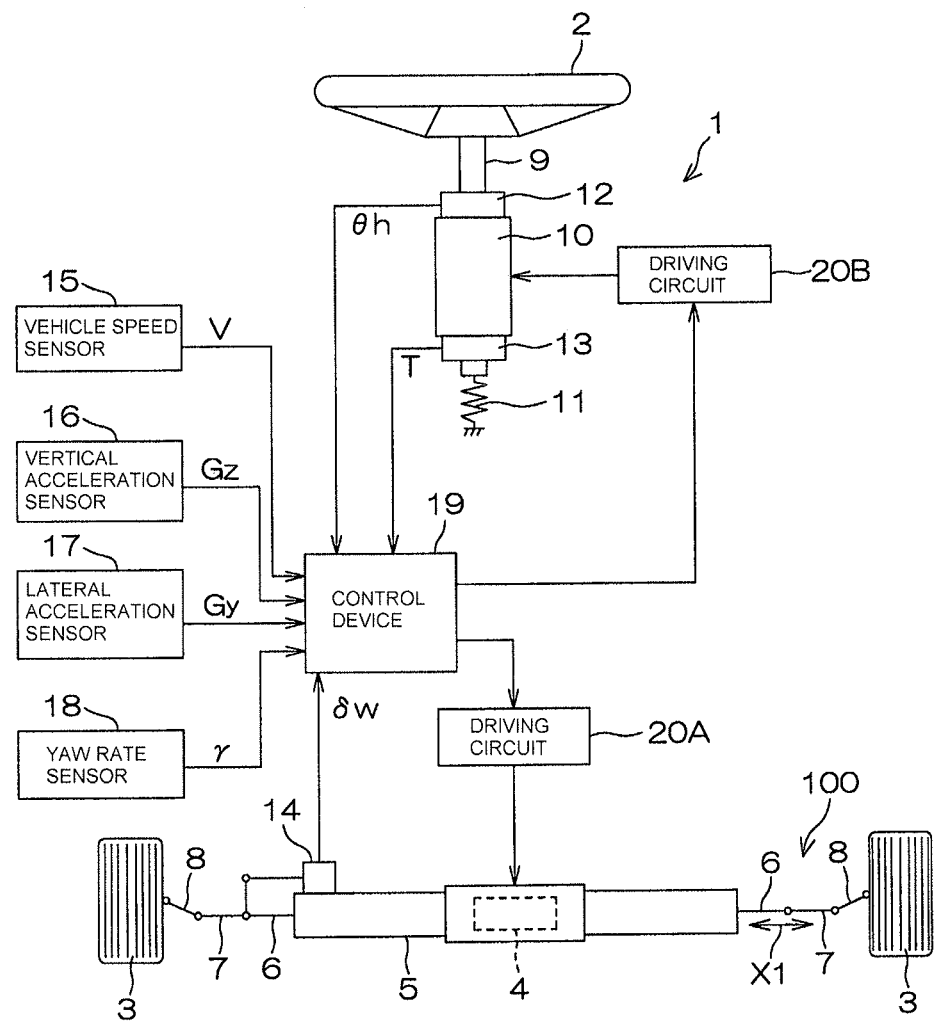
FIG. 1 is a schematic view illustrating the schematic configuration of a vehicle steering system according to an embodiment of the present invention.

FIG. 1 is a schematic view illustrating the schematic configuration of a vehicle steering system according to an embodiment of the present invention. With reference to FIG. 1, the vehicle steering system 1 constitutes a so-called steer-by-wire system in which a mechanical coupling between a steering member 2 such as a steering wheel and steered wheels 3 is eliminated.

An operation of a steering actuator 4 driven in response to a rotational operation of the steering member 2 is converted into a linear motion, in a vehicle-width direction, of a steered shaft 6 supported by a housing 5, and the linear motion of the steered shaft 6 is converted into steered motions of the left and right steered wheels 3 for steering. Thus, steering is achieved.

A driving force (a rotational force of an output shaft) of the steering actuator 4 is converted into a linear motion of the steered shaft 6 in an axial direction X1 (a vehicle-width direction) by a motion conversion mechanism (e.g., a ball screw mechanism) provided in association with the steered shaft 6. The linear motion of the steered shaft 6 is transmitted to tie rods 7 provided so as to project from respective ends of the steered shaft 6, thereby causing knuckle arms 8 to pivot. Thus, steering of the steered wheels 3 supported by the knuckle arms 8 is achieved.

A steering mechanism 100 for steering the steered wheels 3 is constituted by the steered shaft 6, the tie rods 7, the knuckle arms 8, and the like. The housing 5 that supports the steered shaft 6 is fixed to a vehicle body via a bracket (not shown), or the like.

The steering member 2 is connected to a rotary shaft 9 rotatably supported on the vehicle body. A reaction force actuator 10 for applying an operation reaction force to the steering member 2 is attached to the rotary shaft 9. The reaction force actuator 10 includes an electric motor, such as a brushless motor, having an output shaft formed integrally with the rotary shaft 9.

An elastic member 11 constituted by a spiral spring or the like, for example, is connected between the vehicle body and an end portion on the opposite side of the rotary shaft 9 from the steering member 2. When the reaction force actuator 10 applies no torque to the steering member 2, the elastic member 11 causes the steering member 2 to return to a straight steering position using an elastic force thereof.

A steering angle sensor 12 for detecting a steering angle θh of the steering member 2 is provided in association with the rotary shaft 9 to detect an operation input value of the steering member 2. A torque sensor 13 for detecting a steering torque T applied to the steering member 2 is provided on the rotary shaft 9. In the meantime, a steered angle sensor 14 for detecting a steered angle δW (tire angle) of the steered wheels 3 is provided in association with the steered shaft 6.

In addition to these sensors, the following sensors are provided: a vehicle speed sensor 15 that detects a vehicle speed V, a vertical acceleration sensor 16 serving as a rough road condition detecting sensor that detects a vertical acceleration GZ of a vehicle body 60, a lateral acceleration sensor 17 that detects a lateral acceleration Gy of a vehicle, and a yaw rate sensor 18 that detects a yaw rate γ of the vehicle.

Detection signals from the sensors 12 to 18 are input into a control device 19 serving as vehicle control means constituted by an electronic control unit (ECU) including a microcomputer.

The control device 19 sets a target steered angle based on a steering angle θh detected by the steering angle sensor 12, and a vehicle speed V detected by the vehicle speed sensor 15. The control device 19 performs driving control (steering control) on the steering actuator 4 via a driving circuit 20A based on a deviation between the target steered angle and a steered angle δW detected by the steered angle sensor 14.

In the meantime, the control device 19 performs driving control (reaction force control) on the reaction force actuator 10 via a driving circuit 20B based on the detection signals output from the sensors 12 to 18 so that an appropriate reaction force in a direction opposite to a steering direction of the steering member 2 is generated.

Figure 2:
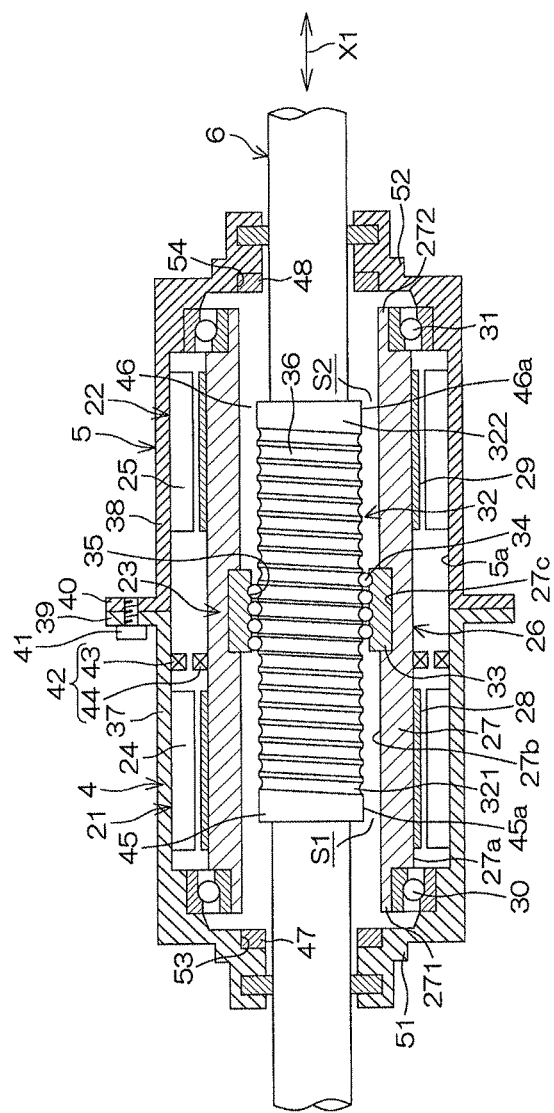
FIG. 2 is a schematic sectional view of a steered shaft and a mechanism for driving the steered shaft.

With reference to FIG. 2, an intermediate part of the steered shaft 6 is inserted within the tubular housing 5. First and second electric motors 21, 22 constituting the steering actuator 4, and a ball screw mechanism 23 serving as a motion conversion mechanism that converts rotations output from the electric motors 21, 22 into an axial movement of the steered shaft 6 are arranged between an inner periphery 5a of the housing 5 and the steered shaft 6 inserted within the housing 5.

The first electric motor 21 and the second electric motor 22 are arranged next to each other in the axial direction X1 within the housing 5. The first electric motor 21 includes a first stator 24 fixed to the inner periphery 5a of the housing 5, and the second electric motor 22 includes a second stator 25 fixed to the inner periphery 5a of the housing 5. The first electric motor 21 and the second electric motor 22 have a common tubular rotor 26 surrounding the periphery of the steered shaft 6.

The rotor 26 includes a tubular rotor core 27 surrounding the periphery of the steered shaft 6, and first and second permanent magnets 28, 29 fitted to an outer periphery 27a of the rotor core 27 so as to be rotatable together with the rotor core 27. The first permanent magnet 28 and the second permanent magnet 29 are arranged next to each other in the axial direction X1. The first permanent magnet 28 faces the first stator 24, and the second permanent magnet 29 faces the second stator 25.

The housing 5 has a first end portion 51 and a second end portion 52. A first end portion 271 of the rotor core 27 is supported rotatably by a first bearing 30 supported by the first end portion 51 of the housing 5. Further, a second end portion 272 of the rotor core 27 is supported rotatably by a second bearing 31 supported by the second end portion 52 of the housing 5. The first and second bearings 30, 31 are constituted by angular contact ball bearings having contact angles reverse to each other.

An axial movement of each of outer rings of the first bearing 30 and the second bearing 31 relative to the housing 5 is restricted, and an axial movement of each of inner rings of the first bearing 30 and the second bearing 31 relative to the rotor core 27 is restricted. Accordingly, an axial movement of the rotor core 27 relative to the housing 5 is restricted.

The ball screw mechanism 23 includes a threaded shaft 32 formed at an intermediate part of the steered shaft 6 in the axial direction X1, a ball nut 33 that surrounds the periphery of the threaded shaft 32 and rotates together with the rotor core 27, and a plurality of balls 34 provided in a row. The balls 34 are interposed between a spiral thread groove 35 (an internal thread groove) formed in an inner periphery of the ball nut 33 and a spiral thread groove 36 (an external thread groove) formed in an outer periphery of the threaded shaft 32.

The ball nut 33 is fitted to an inner periphery 27b of the rotor core 27 so as to be rotatable together with the ball nut 33. Further, the ball nut 33 is fitted in a recessed portion 27c formed in the inner periphery 27b of the rotor core 27, so that an axial relative movement between the ball nut 33 and the rotor core 27 is restricted. In the meantime, as described above, the axial movement of the rotor core 27 relative to the housing 5 is restricted via the first and second bearing 30, 31. Thus, the axial movement of the ball nut 33 relative to the housing 5 is restricted.

The housing 5 is formed by combining a first housing 37 and a second housing 38 together. More specifically, a first annular flange 39 formed on the first housing 37 and a second annular flange 40 formed on the second housing 38 butt against one another. The first and second annular flanges 39, 40 are fastened to each other by use of a fastening screw thread 41, so that the first housing 37 and the second housing 38 are connected to each other. Due to the fastening by the fastening screw thread 41, preloads are applied from the first and second housings 37, 38 to the first and second bearings 30, 31, which are angular contact ball bearings.

A rotation angle sensor 42, such as a resolver, which detects a rotation angle of the rotor 26 is arranged in the housing 5. More specifically, the rotation angle sensor 42 includes a sensor stator 43 fixed to the inner periphery 5a of the housing 5, and a sensor rotor 44 connected to the outer periphery (the outer periphery 27a of the rotor core 27) of the rotor 26 so as to be rotatable together with the rotor 26.

The threaded shaft 32 is provided at the intermediate part of the steered shaft 6 in the axial direction X1. The steered shaft 6 has a first contact portion 45 that is adjacent to a first end portion 321 of the threaded shaft 32, and has a second contact portion 46 that is adjacent to a second end portion 322 of the threaded shaft 32. The first and second contact portions 45, 46 are formed from the same material as that of the steered shaft 6, and formed integrally with the steered shaft 6. Each of the contact portions 45, 46 has an outside diameter that is substantially the same as an outside diameter of a thread part of the threaded shaft 32.

A radial gap S1 is formed between an outer periphery 45a of the first contact portion 45 and an inner periphery of the rotor 26 (corresponding to the inner periphery 27b of the rotor core 27). Further, a radial gap S2 is formed between an outer periphery 46a of the second contact portion 46 and the inner periphery of the rotor 26 (corresponding to the inner periphery 27b of the rotor core 27). Thus, each of the contact portions 45, 46 is able to move smoothly within the rotor core 27 in accordance with movement of the steered shaft 6 in the axial direction X1.

In the meantime, within the housing 5, a first stopper 47 is attached to a fitting surface 53 formed at the first end portion 51 of the housing 5. Further, within the housing 5, a second stopper 48 is attached to a fitting surface 54 formed at the second end portion 52 of the housing 5. The first and second stoppers 47, 48 are made of a material having a strength higher than that of iron casting, for example, which constitutes the housing 5. The first and second stoppers 47, 48 are made of carbon steel e.g., S45C, having a high strength.

Figure 3A:
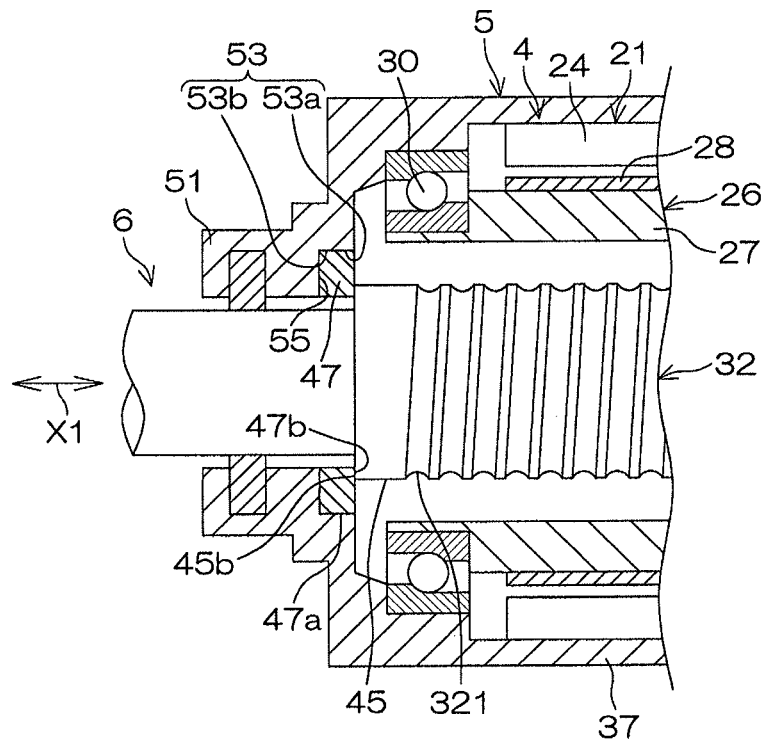
FIG. 3A is a sectional view of main portions of the vehicle steering system, illustrating a state in which a travel amount of the steered shaft is restricted based on a moving direction of the steered shaft.

As illustrated in FIG. 3A, which is a magnified view, the fitting surface 53 of the first end portion 51 of the housing 5 has a loose fit portion 53a to which an outer periphery 47a of the first stopper 47 is fitted loosely, and a tight fit portion 53b to which the outer periphery 47a of the first stopper 47 is fitted tightly. The tight fit portion 53b is located at a deeper side (a left side in the drawing) of a fitting stroke for the first stopper 47 than the loose fit portion 53a. Further, the first end portion 51 of the housing 5 has a receiving portion 55 that receives the first stopper 47 in the axial direction X1.

Figure 3B:
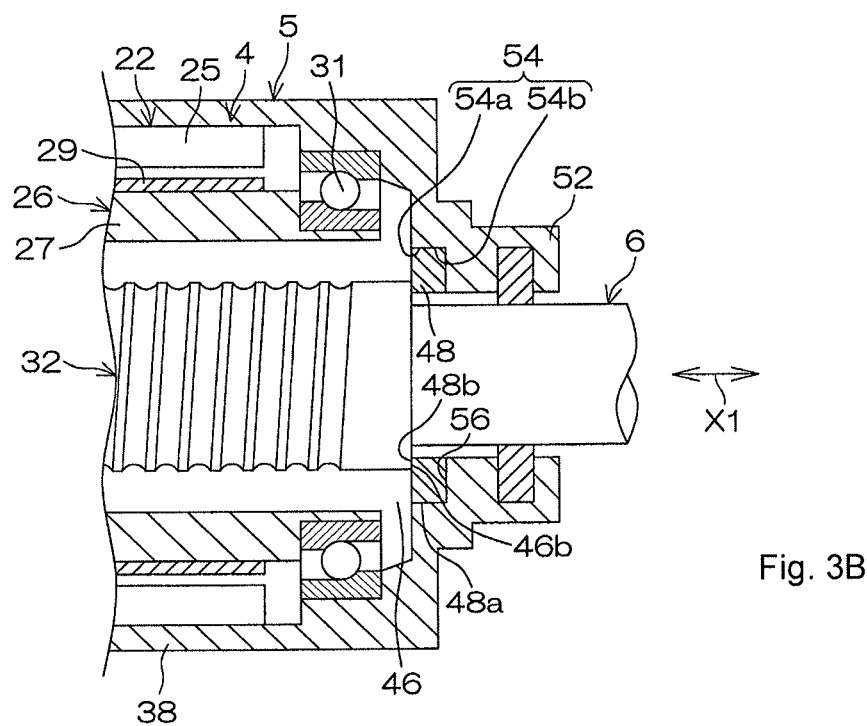
FIG. 3B is a sectional view of main portions of the vehicle steering system, illustrating a state in which a travel amount of the steered shaft is restricted based on a moving direction of the steered shaft.

As illustrated in FIG. 3B, which is a magnified view, the fitting surface 54 of the second end portion 52 of the housing 5 has a loose fit portion 54a to which an outer periphery 48a of the second stopper 48 is fitted loosely, and a tight fit portion 54b to which the outer periphery 48a of the second stopper 48 is fitted tightly. The tight fit portion 54b is located at a deeper side (a right side in the drawing) of a fitting stroke for the second stopper 48 than the loose fit portion 54a. Further, the second end portion 52 of the housing 5 has a receiving portion 56 that receives the second stopper 48 in the axial direction X1.

When the steered shaft 6 moves to the left side (the left side in FIG. 2) in the axial direction X1, an end face 45b, serving as a contact surface, of the first contact portion 45, which is a contact portion on the moving direction side and passed through the rotor core 27 of the rotor 26, contacts an end face 47b of the first stopper 47 serving as a contact surface, as illustrated in FIG. 3A, so that a travel amount of the steered shaft 6 in the axial direction X1 is restricted. The end faces 45b, 47b serving as the contact surfaces are surfaces that are perpendicular to the axial direction X1.

Further, when the steered shaft 6 moves to the right side (the right side in FIG. 2) in the axial direction X1, an end face 46b, serving as a contact surface, of the second contact portion 46, which is a contact portion on the moving direction side and passed through the rotor core 27 of the rotor 26, contacts an end face 48b of the second stopper 48 serving as a contact surface, as illustrated in FIG. 3B, so that the travel amount of the steered shaft 6 in the axial direction X1 is restricted. The end faces 46b, 48b serving as the contact surfaces are surfaces that are perpendicular to the axial direction X1.

The housing 5 is formed by combining the first and second housings 37, 38 together. Accordingly, it is necessary to insert the first stopper 47 deeply into the tubular first housing 37 to attach the first stopper 47 to the first housing 37. Similarly, it is necessary to insert the second stopper 48 deeply into the tubular second housing 38 to attach the second stopper 48 to the second housing 38. Therefore, the work at a deeper portion is difficult, which may cause a possibility that assembly performance would worsen.

Figure 4:
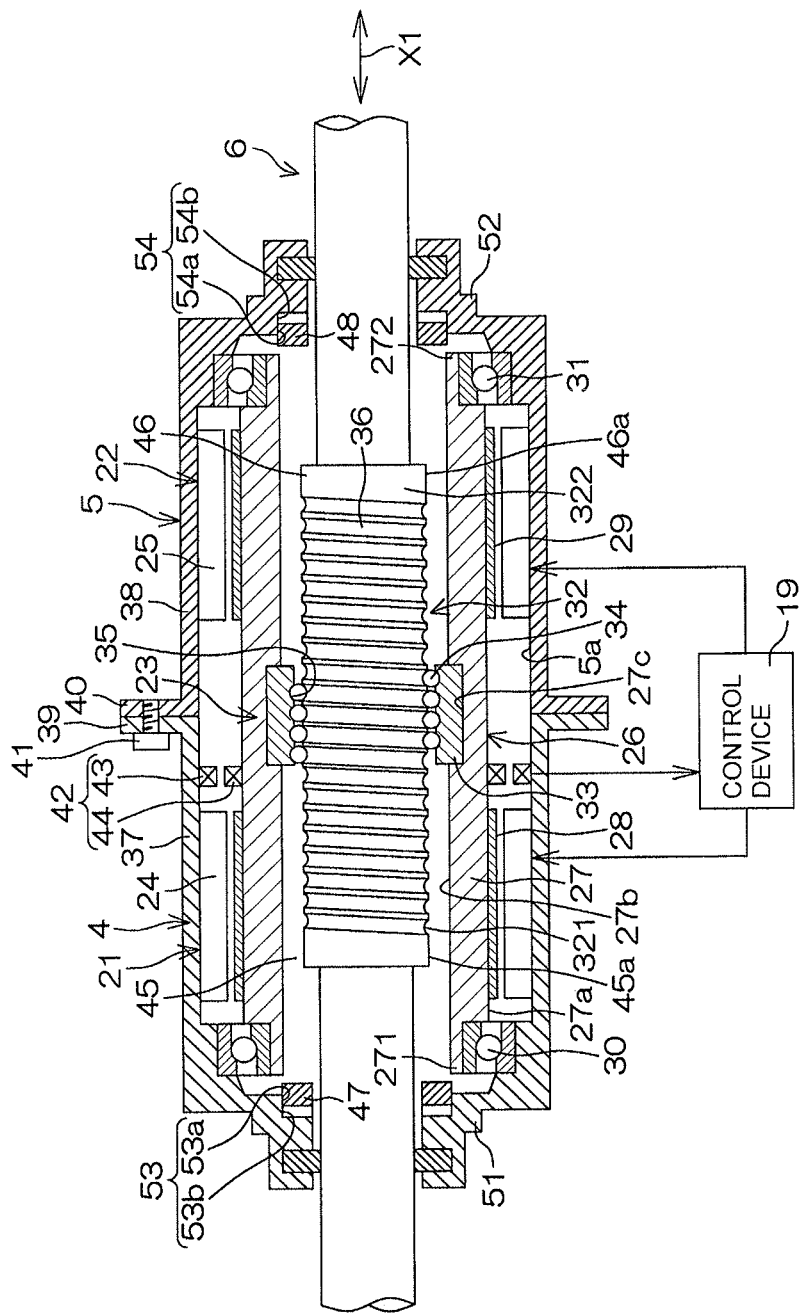
FIG. 4 is a schematic view illustrating the schematic configuration in a case where the steered shaft is moved axially by use of an electric motor of the vehicle steering system in a fully-fitting step.

Therefore, as illustrated in FIG. 4, in a state where the stoppers 47, 48 are temporarily fitted to the corresponding fitting surfaces 53, 54 (more specifically, in a state where the stoppers 47, 48 are fitted only to the loose fit portions 53a, 54a), the steered shaft 6 is caused to reciprocate in the axial direction X1 to its stroke ends by the electric motors 21, 22, thereby causing the stoppers 47, 48 to be fully fitted to the corresponding fitting surfaces 53, 54 by the corresponding contact portions 45, 46 of the steered shaft 6. The timing of completion of a fully-fitting step can be set as a timing that is reached after a predetermined time has elapsed from the timing which is detected based on an output from the rotation angle sensor 42 and at which rotation of the rotor 26 of the electric motors 21, 22 is stopped.

Because the attachment structure for the second stopper 48 has a symmetric relation to the attachment structure for the first stopper 47, a manufacturing method for the vehicle steering system 1 will be described, mainly focusing on an operation for attaching the first stopper 47.

Figure 5A:
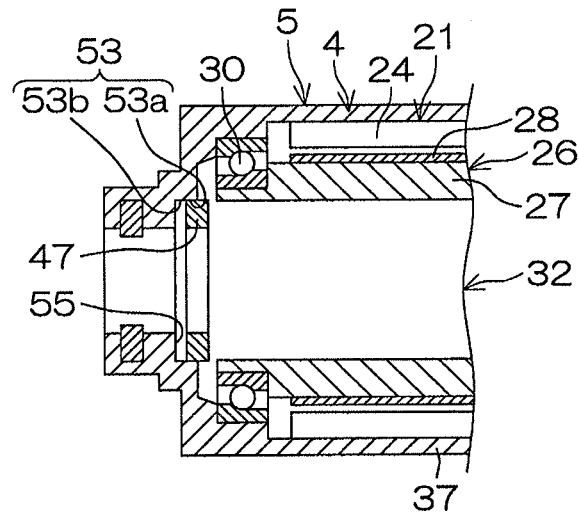
FIG. 5A is a schematic view illustrating a half-fitting step of a manufacturing method for a vehicle steering system.

At first, in a temporarily-fitting step illustrated in FIG. 5A, the first stopper 47 is temporarily fitted to the fitting surface 53 such that the first stopper 47 is fitted only to the loose fit portion 53a of the fitting surface 53 of the tubular housing 5 (the first housing 37).

A temporarily-fitting step for the second stopper 48 (not shown) is similar to the temporarily-fitting step for the first stopper 47. That is, the second stopper 48 is temporarily fitted to the fitting surface 54 such that the second stopper 48 is fitted only to the loose fit portion 54a of the fitting surface 54 of the tubular housing 5 (the second housing 38).

Then, the first and second housings 37, 38 are assembled from the respective sides of the steered shaft 6 so that the state illustrated in FIG. 4 is achieved.

Figure 5B:
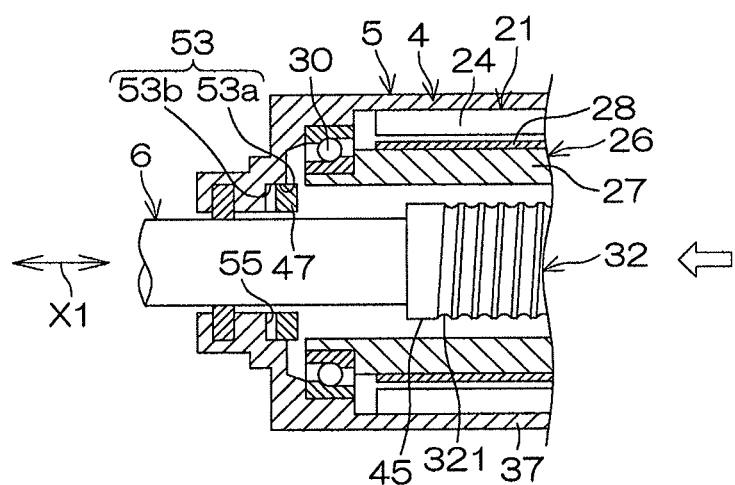
FIG. 5B is a schematic view illustrating a fully-fitting step of the manufacturing method for a vehicle steering system.
Figure 5C:
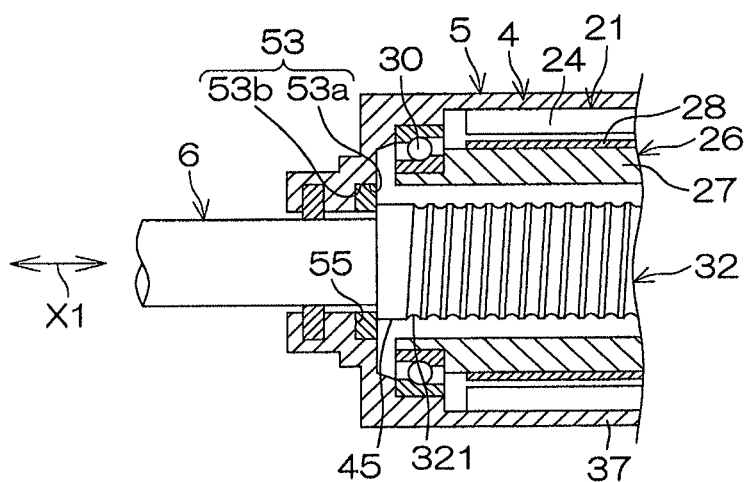
FIG. 5C is a schematic view illustrating a fully-fitting step of the manufacturing method for a vehicle steering system.

Subsequently, in a fully-fitting step for the first stopper 47, as illustrated in FIGS. 5B to 5C, the ball nut 33 is rotationally driven by the electric motors 21, 22 to move the steered shaft 6 in the axial direction X1, so that the first stopper 47 is fully fitted to the tight fit portion 53b of the fitting surface 53 by the first contact portion 45 of the first end portion 321 of the threaded shaft 32.

When the first stopper 47 contacts the receiving portion 55 of the housing 5, the steered shaft 6 becomes immovable in the axial direction X1. This causes the rotor 26 of the electric motors 21, 22 to be non-rotatable. The fact that the rotor 26 has become non-rotatable is detected based on an output from the rotation angle sensor 42, and the fully-fitting step is finished by stopping the driving of the electric motors 21, 22 at the timing that is reached after the predetermined time has elapsed from the timing of the detection.

Figure 6:
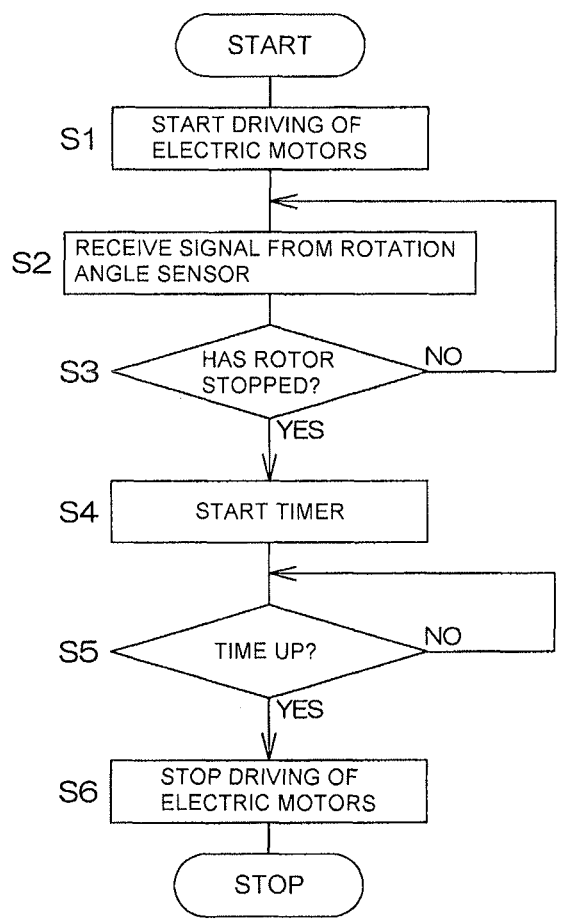
FIG. 6 is a flowchart illustrating a control flow in the fully-fitting step.

More specifically, as illustrated in a flow of FIG. 6, the electric motors 21, 22 constituting the steering actuator 4 are started to be driven (step S1). Then, a signal from the rotation angle sensor 42 is received so as to monitor whether the rotor 26 has stopped or not, based on a result of detection of the rotation angle sensor 42 (steps S2, S3). When the fact that the rotor 26 has stopped is detected in step S3 (NO in step S3), counting by a timer is started (step S4). When counting-up by the timer is finished (YES in step S5), the driving of the electric motors 21, 22 is stopped (step S6), and thus the process is finished.

An operation for attaching the second stopper 48 is similar to the operation for attaching the first stopper 47.

With the vehicle steering system 1 according to the present embodiment, based on a moving direction of the steered shaft 6, one of the contact portions 45, 46 of the steered shaft 6 passes through the rotor 26 so as to contact a corresponding one of the stopper 47, 48, thereby restricting a travel amount of the steered shaft 6. Because both the stoppers 47, 48 are constituted by members different from the housing 5, it is possible to form the stoppers 47, 48 from a material having a strength higher than that of the housing 5, thereby making it possible to improve a strength of the vehicle steering system 1.

Further, the first and second contact portions 45, 46 housed in the rotor 26 are provided respectively at the first and second end portions 321, 322 of the threaded shaft 32 provided at the intermediate part of the steered shaft 6. Accordingly, it is possible to restrict the travel amount of the steered shaft 6 within the housing 5, while reducing the size in the axial direction X1 and the radial direction. Further, each of the stoppers 47, 48 do not run on the threaded shaft 32.

Furthermore, because the contact portions 45, 46 are formed from the same material as that of the steered shaft 6 and formed integrally with the steered shaft 6, it is possible to simplify the structure. Further, in comparison with a case where the contact portions are constituted by members different from the steered shaft, it is possible to obtain the contact portions 45, 46 having a sufficient strength, while reducing the size in the axial direction X1 and the radial direction.

Further, the annular stoppers 47, 48 are fitted to the corresponding fitting surfaces 53, 54 of the housing 5, and the stoppers 47, 48 are received by the corresponding receiving portions 55, 56 of the housing 5 in the axial direction X1. Therefore, assembly is easily performed, and, further, the stoppers 47, 48 are reliably retained.

Further, when the stoppers 47, 48 are fitted to the corresponding fitting surfaces 53, 54, the stoppers 47, 48 are temporarily fitted to the loose fit portions 53a, 54a of the corresponding fitting surfaces 53, 54 at first, and then, fully fitted to the tight fit portions 53b, 54b of the corresponding fitting surfaces 53, 54. Accordingly, after the stoppers 47, 48 are temporarily fitted to the corresponding fitting surfaces 53, 54, the steered shaft 6 is driven axially, thereby allowing the stoppers 47, 48 to be fully fitted to the corresponding fitting surfaces 53, 54 by pressing the stoppers 47, 48 in the axial direction X1 by the corresponding contact portions 45, 46.

That is, as shown in the manufacturing method for the vehicle steering system 1 according to the present embodiment illustrated in FIG. 4 and FIG. 5A to C, after the stoppers 47, 48 are temporarily fitted to the loose fit portions 53*a*, 54*a* of the fitting surfaces 53, 54 formed at the respective end portions 51, 52 of the tubular housing 5 (the temporarily-fitting step illustrated in FIG. 5A), the steered shaft 6 is moved in the axial direction X1 so that, by the first and second contact portions 45, 46 formed respectively at the first and second end portions 321, 322 of the threaded shaft 32 at the intermediate part of the steered shaft 6, the corresponding stoppers 47, 48 are fully fitted to the tight fit portions 53*b*, 54*b* of the corresponding fitting surfaces 53, 54 (the fully-fitting step illustrated in FIG. 5B to C).

Further, in the fully-fitting step, the steered shaft 6 is driven in the axial direction X1 via the ball screw mechanism 23 by the electric motors 21, 22 housed in the housing 5, thereby allowing the stoppers 47, 48 to be fully fitted to the corresponding fitting surfaces 53, 54.

Further, in the fully-fitting step, it is possible to detect the timing at which the stoppers 47, 48 contact the corresponding receiving portions 55, 56 and the steered shaft 6 becomes immovable in the axial direction X1, as the timing at which the rotor 26 actually stops, based on an output from the rotation angle sensor 42 (see steps S2, S3 in FIG. 6). Thus, it is possible to finish the fully-fitting step by stopping the driving of the electric motors 21, 22 (see step S6 in FIG. 6) at the timing that is reached after the predetermined time has elapsed from the timing of the detection (see steps S4, S5 in FIG. 6).

Accordingly, it is possible to avoid the situation where the electric motors 21, 22 continue to be driven unnecessarily although the fully-fitting step has been finished. As a result, it is possible to prevent damages to the contact portions 45, 46, the stoppers 47, 48, and the housing 5, and further, it is possible to reliably prevent overload on the electric motors 21, 22.

In the embodiment in FIGS. 3A, 3B, the end face 45*b* serving as a contact surface of the first contact portion 45 contacts the end face 47*b* serving as a contact surface of the first stopper 47, thereby restricting the travel amount of the steered shaft 6 in the axial direction X1. The end faces 45*b*, 47*b* serving as the contact surfaces are surfaces that are perpendicular to the axial direction X1. Further, the end face 46*b* serving as a contact surface of the second contact portion 46 contacts the end face 48*b* serving as a contact surface of the second stopper 48, thereby restricting the travel amount of the steered shaft 6 in the axial direction X1. The end faces 45*b*, 47*b* serving as the contact surfaces are surfaces that are perpendicular to the axial direction X1.

Figure 7A:
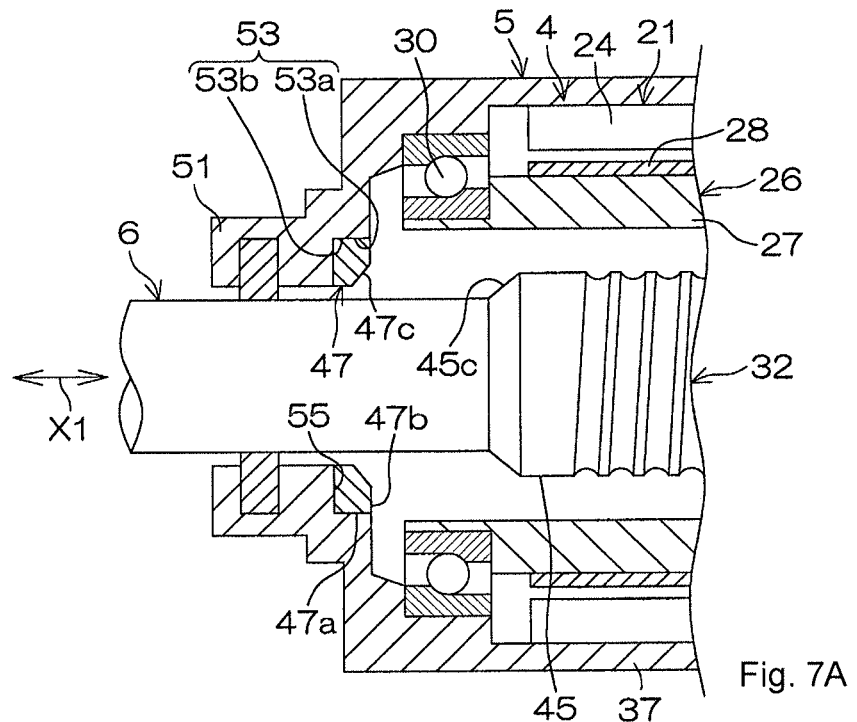
FIG. 7A is a sectional view of main portions of a vehicle steering system according to another embodiment of the present invention.
Figure 7B:
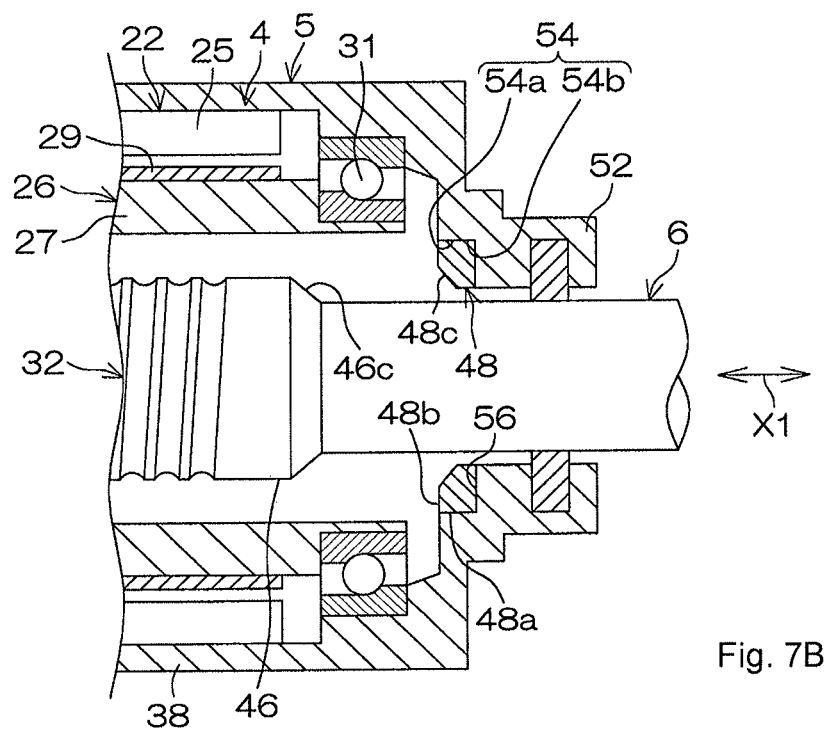
FIG. 7B is a sectional view of main portions of a vehicle steering system according to the other embodiment of the present invention.

In contrast to this, FIGS. 7A and 7B illustrate another embodiment of the present invention. In the present embodiment, as illustrated in FIG. 7A, a conical tapered surface 45*c* serving as a contact surface formed at the first contact portion 45 contacts a conical tapered surface 47*c* serving as a contact surface formed at the end face 47*b* of the first stopper 47, thereby restricting the travel amount of the steered shaft 6 in the axial direction X1. An inclination angle of the conical tapered surface 47*c* with respect to the end face 47*b* of the first stopper 47 is preferably 45° or less, in order to prevent the first stopper 47 from receiving an excessive diameter increasing force when the first stopper 47 receives the first contact portion 45.

Further, as illustrated in FIG. 7B, a conical tapered surface 46*c* serving as a contact surface formed at the second contact portion 46 contacts a conical tapered surface 48*c* serving as a contact surface formed at the end face 48*b* of the second stopper 48, thereby restricting the travel amount of the steered shaft 6 in the axial direction X1. An inclination angle of the conical tapered surface 48*c* with respect to the end face 48*b* of the second stopper 48 is preferably 45° or less, in order to prevent the second stopper 48 from receiving an excessive diameter increasing force when the second stopper 48 receives the first contact portion 46.

In the present embodiment, because contact surfaces of the stoppers 47, 48 and the corresponding contact portions 45, 46 include the conical tapered surfaces 47*c*, 45*c*, 48*c*, 46*c*, it is possible to ensure a large pressure receiving area at the time when the respective stoppers 47, 48 contact the corresponding contact portions 45, 46 and receive a collision load. As a result, it is possible to have a sufficient strength even with a small size.

Figure 8A:
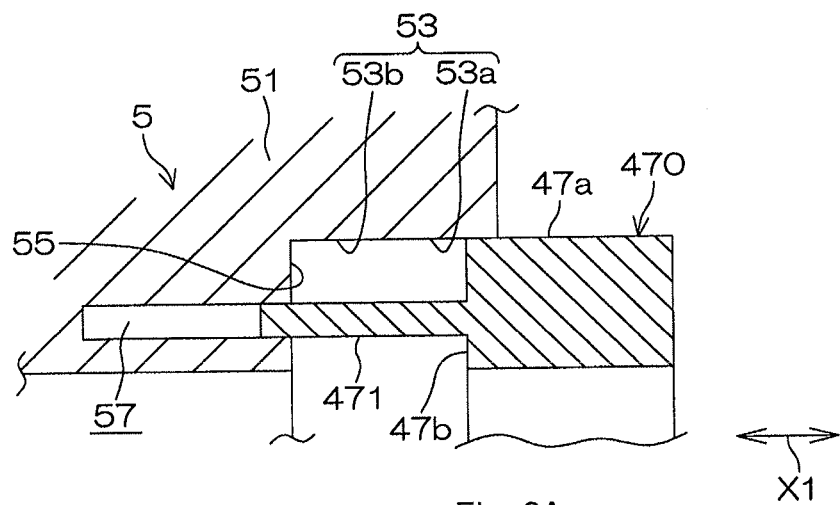
FIG. 8A is a sectional view of main portions of a vehicle steering system according to further another embodiment of the present invention.
Figure 8B:
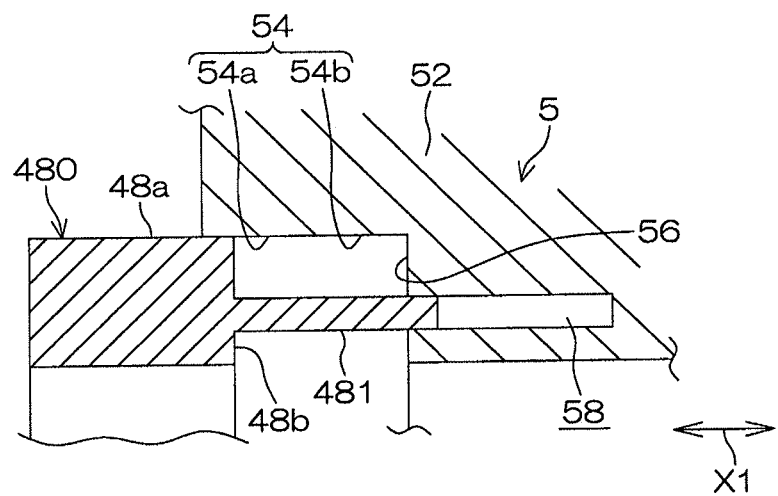
FIG. 8B is a sectional view of main portions of a vehicle steering system according to the further another embodiment of the present invention.

Further, FIGS. 8A, 8B illustrate further another embodiment of the present invention. The present embodiment is different from the embodiment in FIGS. 3A, 3B in the following points. That is, as illustrated in FIG. 8A, a guided protrusion 471 protruding in the axial direction X1 from an end face 47*b* of a first stopper 470 is provided, and a guide hole 57 into which the guided protrusion 471 is inserted is formed in a first end portion 51 of the housing 5. Thus, as the guided protrusion 471 of the first stopper 470 is inserted into the corresponding guide hole 57, the first stopper 470 is guided so as to be fitted to the fitting surface 53.

Further, as illustrated in FIG. 8B, a guided protrusion 481 protruding in the axial direction X1 from an end face 48*b* of a second stopper 48 is provided, and a guide hole 58 into which the guided protrusion 481 is to be inserted is formed in a second end portion 52 of the housing 5. Thus, as the guided protrusion 481 of the second stopper 480 is inserted into its corresponding guide hole 58, the second stopper 480 is guided so as to be fitted to the fitting surface 54.

Figure 9:
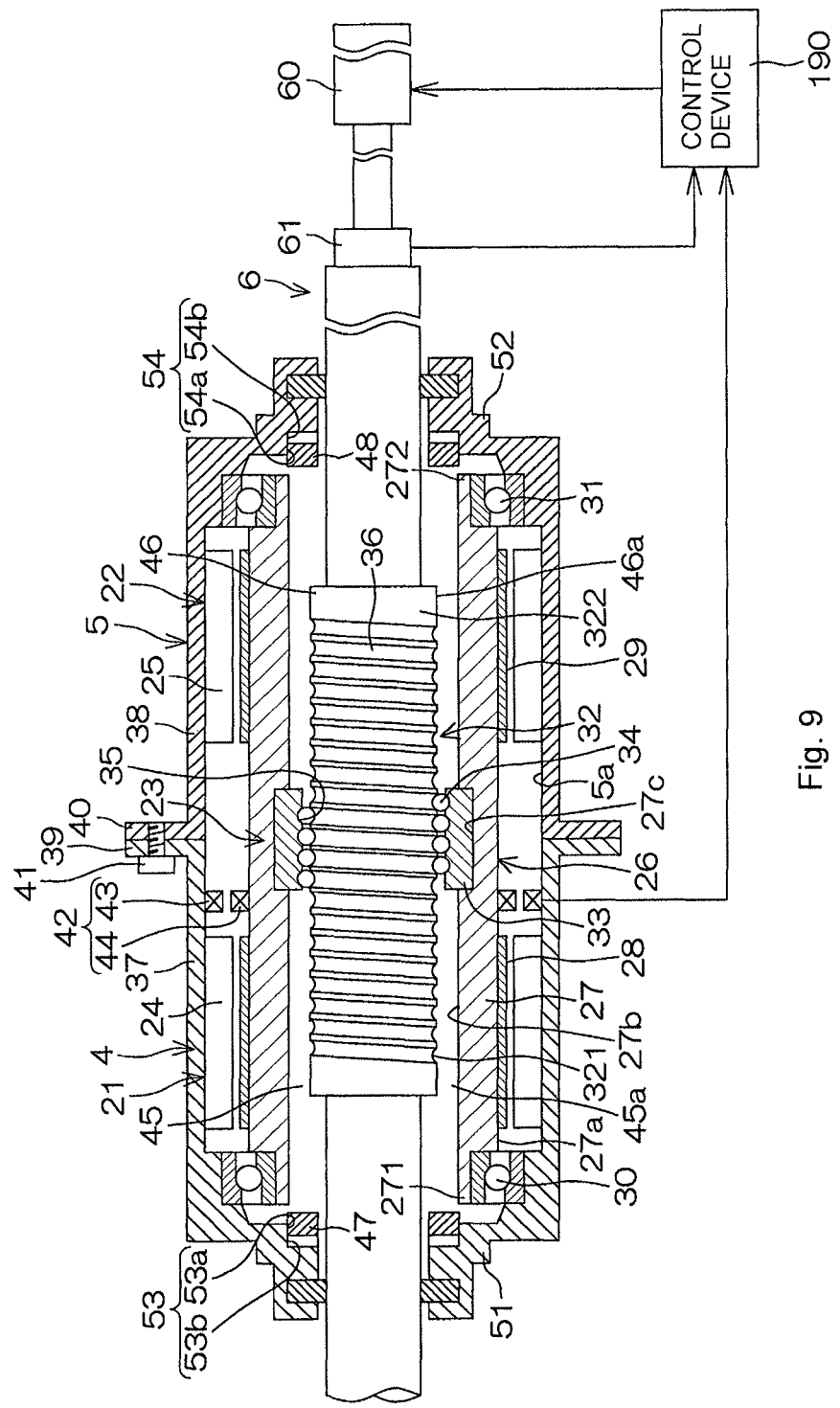
FIG. 9 is a schematic sectional view schematically illustrating a fully-fitting step of axially moving a steered shaft by use of an external actuator in a manufacturing method for a vehicle steering system according to another embodiment of the present invention.

Further, FIG. 9 illustrates yet another embodiment of the present invention. The present embodiment is different from the embodiment of FIG. 4 in the following points. That is, in the embodiment in FIG. 4, the steered shaft 4 is driven in the axial direction X1 by the first and second electric motors 21, 22 constituting the steering actuator 4. In this way, the fully-fitting step is performed. In contrast to this, in the present embodiment, the steered shaft 6 is driven in the axial direction X1 by an actuator 60 provided outside the vehicle steering system 1, without using the steering actuator 4 (the electric motors 21, 22). In this way, the fully-fitting step is performed. Note that a load detection sensor 61 such as a load cell is provided between the actuator 60 and the steered shaft 6, and the steered shaft 6 is driven via the load detection sensor 61.

Figure 10:
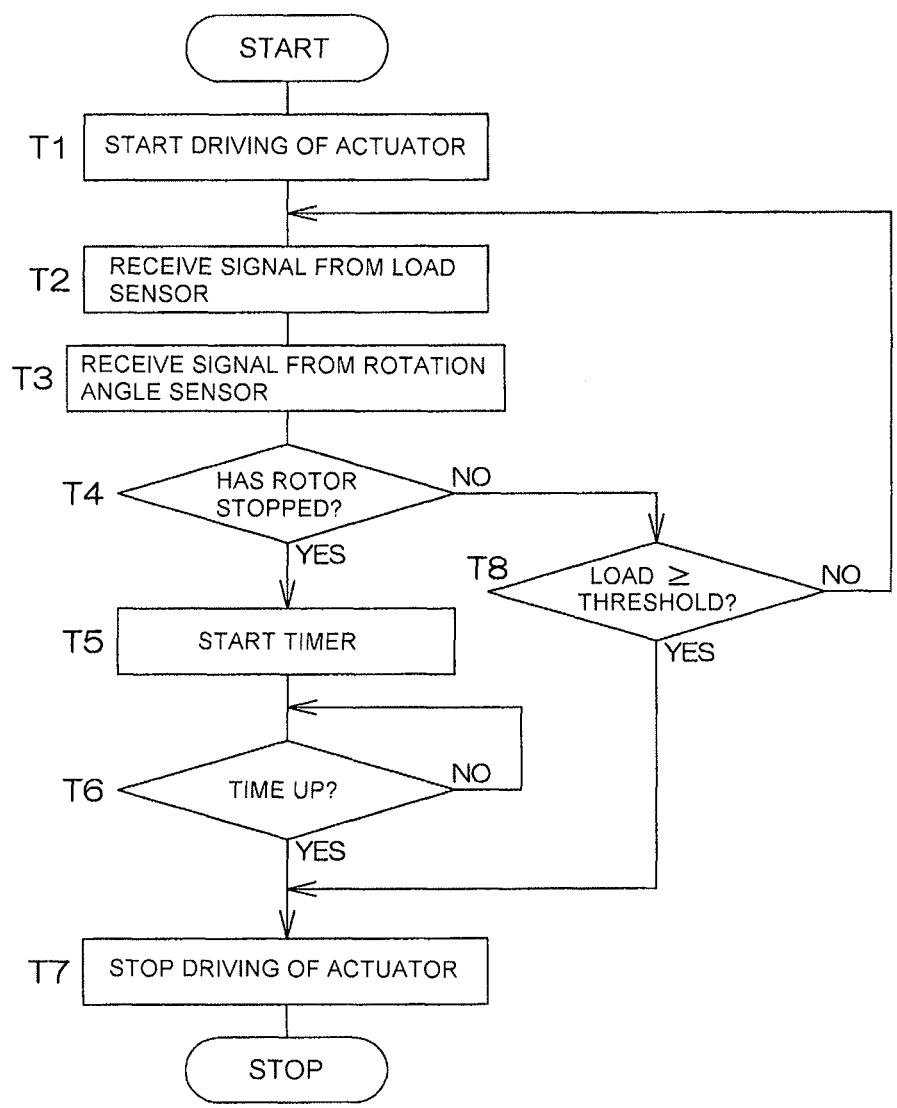
FIG. 10 is a flowchart illustrating a control flow in the fully-fitting step in FIG. 9.

A control device 190 starts driving of the external actuator 60 as illustrated in a flow in FIG. 10 (step T1). Then, a signal from the load sensor 61 is received (step T2), and a signal from a rotation angle sensor 42 is received (step T3).

In step T4, it is determined whether or not the rotor 26 has stopped, based on a result of detection of the rotation angle sensor 42. When the rotor 26 has stopped (YES in step T4), counting by a timer is started (step T5). When counting-up by the timer is finished (YES in step T6), the driving of the actuator 6 is stopped (step T7), and thus the process is finished.

When a detected load is less than a threshold in step T8 (NO in step T8), the process returns to step ST2 and repeats steps T2 to T4, and T8.

On the other hand, when it is determined that the rotor 26 has not stopped in step T4 (YES in step T4), the process proceeds to step T8, and it is determined whether or not a load (corresponding to an axial force of the steered shaft)

detected by the load sensor is equal to or higher than the threshold. When the detected load is equal to or higher than the threshold (YES in step T8), the process proceeds to step T7 to stop driving of the external actuator 60 immediately and finish the process.

In the present embodiment, it is possible to obtain the same effect as that in the embodiment in FIG. 6. Further, even if the rotor 26 has not stopped actually (i.e., even in the case of NO in step T4 of FIG. 10), it is possible to stop the movement of the steered shaft 6 (i.e., to stop the driving of the actuator as illustrated in step T7 of FIG. 10) based on an axial force of the steered shaft 6 (i.e., based on a detection result in step T8 of FIG. 10). Therefore, it is possible to avoid the situation where external actuator 60 continues to be driven unnecessarily although the fully-fitting step has been finished. As a result, an excess load is not applied to the contact portions 45, 46 and the stoppers 47, 48, and it is possible to prevent damages to these components and the housing 5. Further, it is possible to reliably prevent overload on the external actuator 60.

Figure 11:
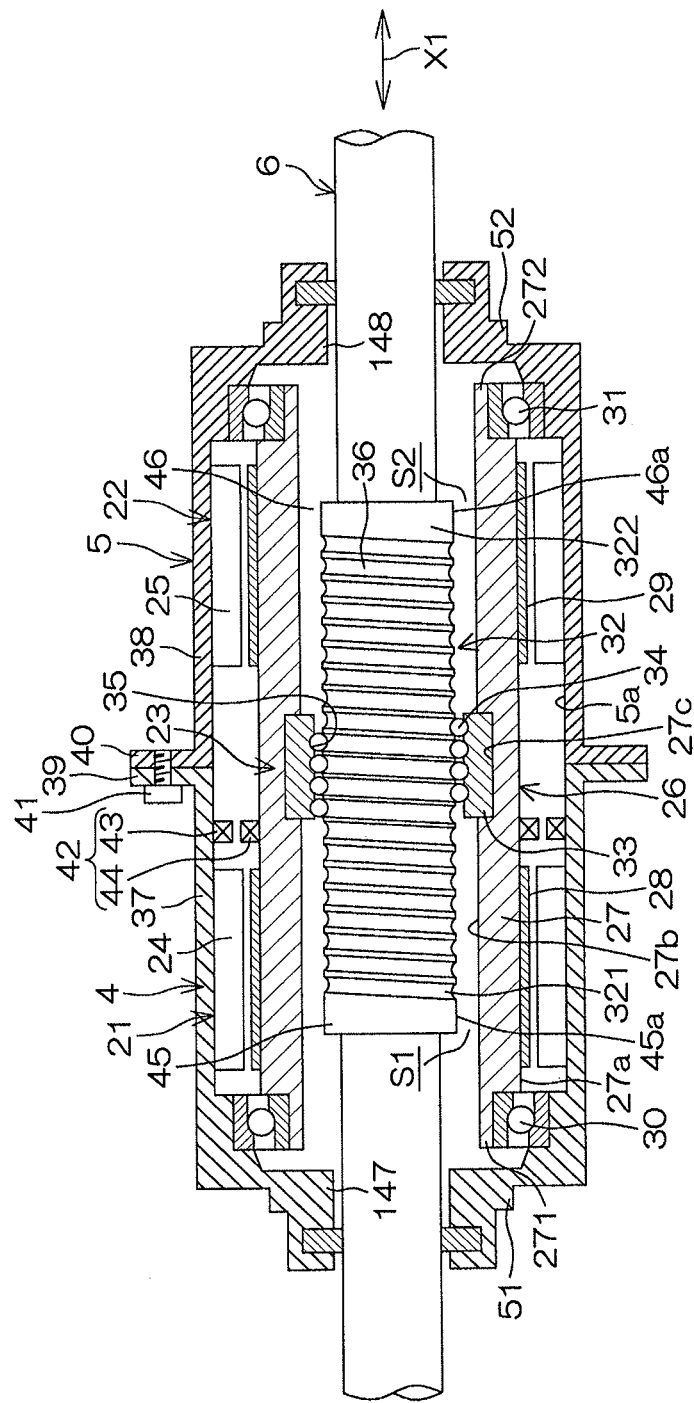
FIG. 11 is a schematic sectional view of a steered shaft and a mechanism for driving the steered shaft according to further another embodiment of the present invention.

The present invention is not limited to the above-described embodiments. For example, in each of the above-described embodiments, the first stopper 47, 470 and the second stopper 48, 480 are attached respectively to the corresponding first and second housings 37, 38 of the housing 5. However, instead of this, as illustrated in FIG. 11, first and second stoppers 147, 148 may be formed from the same material as that of the first and second housings 37, 38 of the housing 5, and formed integrally with the first and second housings 37, 38, respectively. In this case, it is possible to simplify the structure. In addition, various modifications may be made within the scope of appended claims.

DESCRIPTION OF THE REFERENCE SIGNS

1: vehicle steering system, 2: steering member, 3: steered wheel, 4: steering actuator, 5: housing, 6: steered shaft, 7: tie rod, 8: knuckle arm, 21: first electric motor, 22: second electric motor, 23: ball screw mechanism, 24: first stator, 25: second stator, 26: rotor, 27: rotor core, 27*b*: inner periphery (of rotor core), 32: threaded shaft, 321: first end portion (of threaded shaft), 322: second end portion (of threaded shaft), 33: ball nut, 34: ball, 37: first housing, 38: second housing, 42: rotation angle sensor, 45: first contact portion, 45*a*: outer periphery, 45*b*: end face (contact surface), 45*c*: conical tapered surface (contact surface), 46: second contact portion, 46*a*: outer periphery, 46*b*: end face (contact surface), 46*c*: conical tapered surface (contact surface), 47, 470, 147: first stopper, 47*a*: outer periphery, 47*b*: end face (contact surface), 47*c*: conical tapered surface (contact surface), 48, 480, 148: second stopper, 48*a*: outer periphery, 48*b*: end face (contact surface), 48*c*: conical tapered surface (contact surface), 51: first end portion (of housing), 52: second end portion (of housing), 53: fitting surface, 53*a*: loose fit portion, 53*b*: tight fit portion, 54*a*: loose fit portion, 54*b*: tight fit portion, 55, 56: receiving portion, 57, 58: guide hole, 100: steering mechanism, 471, 472: guided protrusion, S1, S2: radial gap, X1: axial direction

The invention claimed is:

1. A manufacturing method for a steer-by-wire vehicle steering system that converts rotative power of an electric motor into a movement of a steered shaft in an axial direction via a ball screw mechanism, the manufacturing method comprising:
   a temporarily-fitting step of loosely fitting first and second stoppers for restricting an axial travel amount of the steered shaft, to loose fit portions of fitting surfaces respectively formed at first and second end portions of a tubular housing; and
   a fully-fitting step of reciprocating the steered shaft in the axial direction, thereby tightly fitting the stoppers to tight fit portions of the corresponding fitting surfaces by first and second contact portions located at first and second end portions of a threaded shaft of the steered shaft.

2. The manufacturing method for a vehicle steering system according to claim 1, wherein, in the fully-fitting step, the steered shaft is axially driven by the electric motor via the ball screw mechanism.

3. The manufacturing method for a vehicle steering system according to claim 2, wherein, in the fully-fitting step, a timing to stop driving of the steered shaft is determined based on an output from a load sensor that detects an axial force of the steered shaft.

4. The manufacturing method for a vehicle steering system according to claim 3, wherein, in the fully-fitting step, a timing to stop driving of the steered shaft is determined based on an output from a rotation angle sensor that detects a rotation angle of a rotor of the electric motor.

5. The manufacturing method for a vehicle steering system according to claim 2, wherein, in the fully-fitting step, a timing to stop driving of the steered shaft is determined based on an output from a rotation angle sensor that detects a rotation angle of a rotor of the electric motor.

6. The manufacturing method for a vehicle steering system according to claim 1, wherein, in the fully-fitting step, the steered shaft is axially driven by an actuator provided outside the vehicle steering system.

7. The manufacturing method for a vehicle steering system according to claim 6, wherein, in the fully-fitting step, a timing to stop driving of the steered shaft is determined based on an output from a rotation angle sensor that detects a rotation angle of a rotor of the electric motor.

* * * * *